(12) United States Patent
Shimada

(10) Patent No.: US 7,494,069 B2
(45) Date of Patent: Feb. 24, 2009

(54) MOBILE COMMUNICATION DEVICE

(75) Inventor: Hajime Shimada, Tokyo (JP)

(73) Assignee: Panasonic Corporation, Osaka (JP)

(*) Notice: Subject to any disclaimer, the term of this patent is extended or adjusted under 35 U.S.C. 154(b) by 287 days.

(21) Appl. No.: 10/578,588

(22) PCT Filed: Nov. 24, 2004

(86) PCT No.: PCT/JP2004/017399

§ 371 (c)(1),
(2), (4) Date: May 8, 2006

(87) PCT Pub. No.: WO2005/053181

PCT Pub. Date: Jun. 9, 2005

(65) Prior Publication Data

US 2007/0004456 A1  Jan. 4, 2007

(30) Foreign Application Priority Data

Nov. 25, 2003 (JP) ............................. 2003-393559

(51) Int. Cl.
*G06K 19/06* (2006.01)
(52) U.S. Cl. .................. 235/493; 235/449; 235/451; 235/492; 455/575.7
(58) Field of Classification Search ................ 235/441, 235/449, 451, 492, 493; 455/558, 550.1, 455/575.5–7, 90.1, 90.3
See application file for complete search history.

(56) References Cited

U.S. PATENT DOCUMENTS 6,814,284 B2 * 11/2004 Ehlers et al. ................. 235/383

| | | | | |
|---|---|---|---|---|
| 6,840,448 B2 * | 1/2005 | Fukushima et al. | ......... | 235/451 |
| 7,251,501 B2 * | 7/2007 | Halpern | ....................... | 455/558 |
| 7,262,736 B2 * | 8/2007 | Sunaga | ........................ | 343/702 |
| 2002/0183094 A1 * | 12/2002 | Seita | ........................... | 455/558 |

FOREIGN PATENT DOCUMENTS

| JP | 8-44833 | 2/1996 |
|---|---|---|
| JP | 11-316806 | 11/1999 |
| JP | 2000-121306 | 4/2000 |
| JP | 2001-28037 | 1/2001 |
| JP | 2001-319206 | 11/2001 |
| JP | 2002-236901 | 8/2002 |
| JP | 2002-314313 | 10/2002 |
| JP | 2003-67692 | 3/2003 |

* cited by examiner

*Primary Examiner*—Seung H Lee
(74) *Attorney, Agent, or Firm*—Pearne & Gordon LLP

(57) ABSTRACT

There is provided with a portable communication device which can perform proximity contactless communication without reducing a distance capable of performing the proximity contactless communication thereby to improve convenience and prevent degradation of the characteristics of the proximity contactless communication.

In a mobile communication device 1 with a proximity contactless communication function, antennas 14A to 14C for performing the proximity contactless communication with an external proximity contactless communication device 2 are provided on the plural surfaces of the casing 10 of the mobile communication device 1. Each of the antennas 14A to 14C has one or more loops and the antennas 14A to 14C are coupled in series.

9 Claims, 16 Drawing Sheets

MOBILE COMMUNICATION DEVICE

TECHNICAL FIELD

The present invention relates to a portable communication device having a proximity contactless communication function.

BACKGROUND ART

Recently, there has been increasing demands for developing a communication system which can copy electric data containing personal information such as data of a telephone book and store into a mobile phone, or which makes it possible to read and write electric medical sheets at a hospital or a pharmacy, or which makes it possible to read or request electronic resident register data such as certificates of residence and family registers, or which can transfer, copy and store data relating to personal hobby (various kinds of data such as music and images) to and in an own mobile phone, etc., or which can read and store amount of money data for a prepaid of an automatic vending machine, etc. in a desired electronic device, or which can be used as a pass, etc. for passing through a wicket at an amusement park or a station, etc. In other words, there has been increasing demands for developing the communication system (hereinafter called as a proximity contactless communication system) which is made in contact to or brought close so as to be contactable to a communication partner thereby to perform a communication (to be concretely, by using the action of electric field or magnetic field).

To this end, there has been investigated as to the developments of various kinds of portable communication devices each having a proximity contactless communication function (hereinafter called as "a portable communication device with a proximity contactless communication function"), each of which can perform the proximity contactless communication with a proximity contactless communication device disposed outside (hereinafter called as "an external proximity contactless communication device") or a proximity contactless communication card disposed outside (hereinafter called as "an external proximity contactless communication card") which serves a partner side at the time of performing the proximity contactless communication (see patent document 1, for example).

As one of the portable communication devices accorded to such the proximity contactless communication system, there is proposed a mobile phone 100 with the proximity contactless communication function as shown in FIG. 16, for example.

As shown in the figure, the mobile phone 100 with the proximity contactless communication function is configured in a manner that a casing 101 is formed in a straight shape (of course, a fordable shape may be used) and contains therein not only an antenna 102 for the mobile phone for transmitting and receiving a signal to and from a base station disposed outside of the figure but also an antenna 103 for the proximity contactless communication for performing the proximity contactless communication with an external proximity contactless communication device 200, etc.

On the other hand, the external proximity contactless communication device 200 includes an antenna 201 for the proximity contactless communication for performing the proximity contactless communication.

Incidentally, in the figure, a symbol 106 depicts a battery chamber which houses a battery unit 105 for feeding therein and is closed by a battery lid 104.

The mobile phone 100 with the proximity contactless communication function is configured so as to perform communication or data communication with a base station via the antenna 102 for the mobile phone. The mobile phone 100 is also configured so as to perform the proximity contactless communication between the antenna 103 for the proximity contactless communication within the casing 101 of the mobile phone 100 and the antenna 201 for the proximity contactless communication within the casing of the external proximity contactless communication device 200 when the antenna 103 for the proximity contactless communication provided near the one surface (the upper surface in FIG. 16) within the casing 101 of the mobile phone 100 is made in contact to or brought close to and placed over the external proximity contactless communication device 200.

However, in the mobile phone 100 with the proximity contactless communication function, as described above, the antenna 103 for the proximity contactless communication is disposed at the one surface of the casing 101 of the mobile phone 100. Thus, in the case of performing the proximity contactless communication, when the surface other than the one surface of the casing 101 is made in contact to or brought close to and placed over the device, it is often the case that proximity contactless communication error arises due to the directivity of the antenna 103 for the proximity contactless communication. As a result, there is a problem that the convenience is not good in a point that the particular surface of the casing 101 is required to be placed over the device.

Therefore, as described in a patent document 2, for example, there is proposed such a structure that two antennas for proximity contactless communication are provided in parallel to each other so that the proximity contactless communication can be performed without being limited to the one surface. However, according to such a configuration, since the antennas are provided in parallel to each other, the total inductance value of the antennas decreases. In this case, in order to resonate the antenna at a desired frequency, it is necessary to increase the inductance component of the antenna or to increase the constant value of a resonance capacitor.

In general, in order to increase the inductance component of the antenna, it is necessary to increase the area of the antenna and increase the number of turns of a conductor constituting the antenna. However, it is difficult to increase the areas of the plural antennas in a small-sized communication device such as the portable communication device. Further, when the constant value of the resonance capacitor is made large, there arises a problem that the gain of the antenna for proximity contactless communication reduces and so a distance capable of performing the proximity contactless communication reduces.

Thus, as shown in a patent document 3 and a patent document 4, for example, when the antenna for proximity contactless communication is configured in an L-shape, the proximity contactless communication can be performed as to two surfaces or more without being limited to one surface without reducing the inductance value of the antenna.

However, according to such a configuration, with respect to only one surface, in the case of performing the proximity contactless communication by placing this surface in parallel to the antennal of the external proximity contactless communication device, since there is no antenna at the corner portion of the L-shape, the magnetic flux density at the one surface is reduced as compared with the case where the antenna loop is configured by only one surface. As a result, there arises a problem that a distance capable of performing the proximity contactless communication reduces.

Thus, as described in a patent document 5, for example, when an antenna for proximity contactless communication is formed in a loop shape at each of six surfaces, the proximity contactless communication can be performed at not only one surface but also the respective surfaces. Simultaneously, when considering each one of the respective surfaces, since the each surface forms the loop, the reduction of the magnetic flux density can be prevented and the distance capable of performing the proximity contactless communication can be maintained effectively.

However, according to this configuration, when the antennas at the plural surfaces are influenced by the magnetic fluxes, the currents generated at the respective antennas flow in opposite directions and so there arise a problem that the proximity contactless communication error occurs.

Patent document 1: JP-A-2002-236901 (page 2, right column, [0002])
Patent document 2: JP-A-2001-28037
Patent document 3: JP-A-08-44833
Patent document 4: JP-A-11-316806
Patent document 5: JP-A-2001-319206

DISCLOSURE OF THE INVENTION

Problems that the Invention is to Solve

The invention is made in order to solve the aforesaid problems of the related arts and an object of the invention is to provide a portable communication device which can perform the proximity contactless communication without reducing a distance capable of performing the proximity contactless communication even by using another portion (another surface) other than a particular one surface (a communication surface) thereby to improve the convenience and prevent the degradation of the characteristics of the proximity contactless communication.

Means for Solving the Problems

The portable communication device according to the invention is configured in a manner that in the portable communication device having a proximity contactless communication function, comprising an antenna for performing proximity contactless communication with an external proximity contactless communication device or an external proximity contactless communication card, the antenna being provided on a plurality of surfaces of a casing of the portable communication device, each of the antennas has at least one loop, and the antennas are coupled in series.

According to this configuration, in the case of performing the proximity contactless communication with the external proximity contactless communication device, since the antennas for the external proximity contactless communication are disposed on the plural surfaces of the casing of the portable communication device, the external proximity contactless communication can be performed at a portion other than a particular surface of the casing by placing the portable communication device over the external proximity contactless communication device, for example.

Alternatively, the portable communication device according to the invention is configure in a manner that in the portable communication device having a proximity contactless communication function, comprising an antenna for performing proximity contactless communication with an external proximity contactless communication device or an external proximity contactless communication card, the antenna being provided on a plurality of surfaces of a battery pack housed in a battery chamber of a casing of the portable communication device or on a plurality of surfaces of a lid portion for closing a battery chamber provided separately from the battery pack, each of the antennas has at least one loop, and the antennas are coupled in series.

According to this configuration, in the case of performing the proximity contactless communication with the external proximity contactless communication device, since the antennas for the external proximity contactless communication are disposed on the plural surfaces of the battery pack of the portable communication device or on the plural surfaces of the lid portion, the external proximity contactless communication can be performed at a portion other than a particular surface of the casing by placing the portable communication device over the external proximity contactless communication device, for example.

Alternatively, the portable communication device according to the invention is configure in a manner that in the portable communication device having a proximity contactless communication function, comprising an antenna for performing proximity contactless communication with an external proximity contactless communication device or an external proximity contactless communication card, the antenna being provided on a plurality of surfaces of a main body portion of a battery pack housed in a battery chamber of a casing of the portable communication device or on a plurality of surfaces of a lid portion which closes the battery chamber and is provided integrally with the battery pack, each of the antennas has at least one loop, and the antennas are coupled in series.

According to this configuration, in the case of performing the proximity contactless communication with the external proximity contactless communication device, since the antennas for the external proximity contactless communication are disposed on the plural surfaces of (the main body portion of) the battery pack or on the plural surfaces of the lid portion provided integrally with the battery pack, the external proximity contactless communication can be performed at a portion other than a particular surface of the casing by placing the portable communication device over the external proximity contactless communication device, for example.

Alternatively, the portable communication device according to the invention is configure in a manner that the electromagnetic interference suppression sheet is provided on the side in opposite to the communication surface of the antenna which opposes to the proximity contactless communication device.

In this manner, since the electromagnetic interference suppression sheet is provided on the side in opposite to the communication surface of the antenna for the proximity contactless communication device which performs the proximity contactless communication.

Alternatively, the portable communication device according to the invention further comprises an antenna for the mobile phone for performing mobile phone communication, and an antenna feeding point for the mobile phone, wherein the antenna for the mobile phone and the antenna feeding point are provided in separation from the antenna for the proximity contactless communication by the required distance or more.

According to this configuration, it is also possible to use as the mobile phone. Further, since the antenna feeding point for the mobile phone is disposed so as to secure by the required distance from the antenna for the proximity contactless communication, in the case of using for the proximity contactless communication, the entering of high-frequency radio wave (high-frequency radiation) into the antennas for the proximity contactless communication from the antenna feeding point for the mobile phone can be suppressed.

EFFECTS OF THE INVENTION

According to the invention, since the small-sized antennas for the proximity contactless communication are formed on the plural surfaces as for the portable communication device, the proximity contactless communication can be performed by the plural surfaces. Further, since the antennas for the proximity contactless communication are disposed within the battery pack for the portable communication device or at the battery lid, an advantage can be attained that the proximity contactless communication can be performed on the surfaces more than the surfaces on which the antennas for the proximity contactless communication are disposed.

Further, as to the portable communication device also including the mobile phone function, it is possible to provide the portable communication device which can prevent the high-frequency components irradiated as the mobile phone signals from entering into the antennas for the proximity contactless communication.

Figure 1:
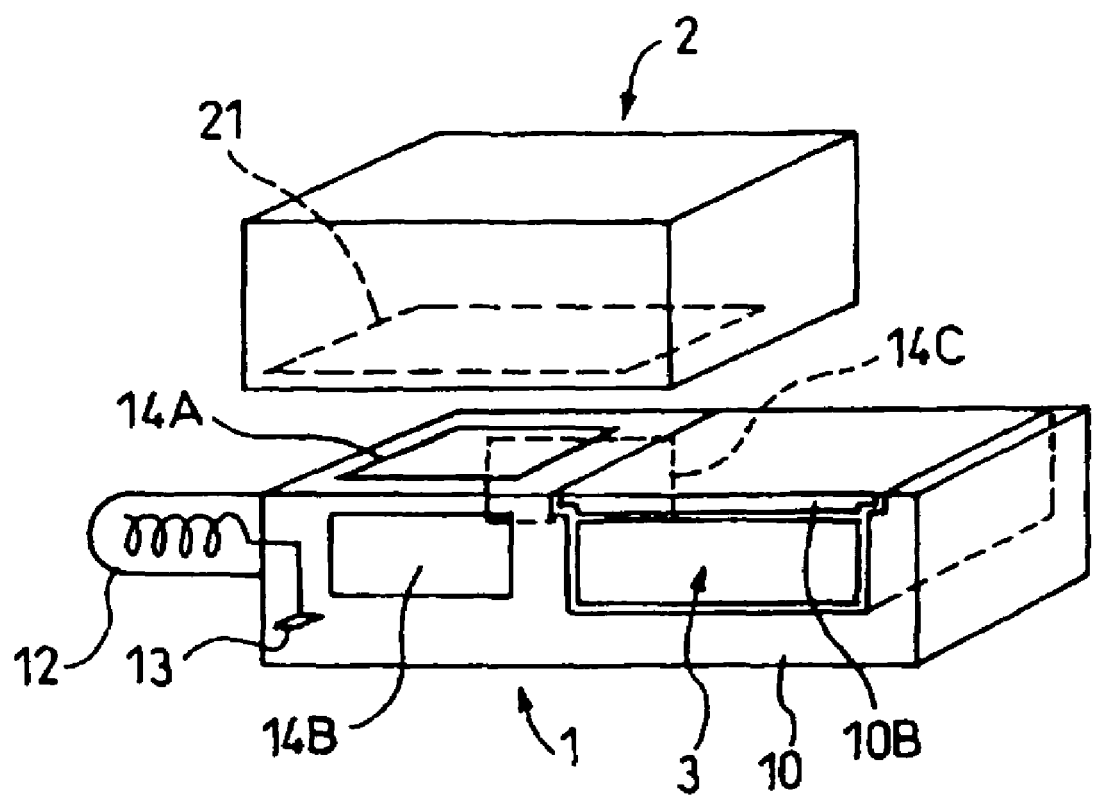
[FIG. 1] A schematic diagram showing the configurations of the portable communication device according to the first embodiment of the invention and an external proximity contactless communication device.

DESCRIPTION OF THE REFERENCE NUMERALS AND SIGNS 1 portable communication device
10 casing
10A battery chamber
10B battery lid
10C upper surface
10D lower surface
10E step portion
11 casing
12 antenna for mobile phone (first antenna)
13 antenna feeding point
14A to 14C antenna for proximity contactless communication
15A to 15C electromagnetic interference suppression sheet
16 impedance matching portion
17 control portion
2 external proximity contactless communication device
21 antenna
3 battery pack (battery unit)
4 battery pack (battery lid is provided separately)
5 battery pack (main body portion; battery lid is provided integrally)
5A battery lid (lid portion)
5B brim portion
D1, D2 distance between the adjacent antennas for proximity contactless communication mounted on a portable communication device
A, B coupling portion between antenna for proximity contactless communication and impedance matching portion of antenna for proximity contactless communication.

BEST MODE FOR CARRYING OUT THE INVENTION

Hereinafter, an embodiment of the invention will be explained in detail with reference to the accompanying drawings.

First Embodiment

The explanation will be made with reference to FIGS., 1 to 12 as to a mobile communication device 1 having the proximity contactless communication function according to the first embodiment of the invention and a proximity contactless communication device disposed outside (hereinafter called as "an external proximity contactless communication device") 2.

As shown in FIG. 1, the mobile communication device 1 according to the invention has two communication functions of the mobile phone function (a mobile phone portion) as a normal mobile phone and the proximity contactless communication function (a proximity contactless communication portion) as a portable communication device for communicating with the external proximity contactless communication device 2. A casing 10 portion has a straight shape including not-shown operation keys, an LCD, etc.

Although the portable communication device has the straight-shaped structure, the present invention is not limited there to and maybe configured in a foldable shape.

The casing 10 includes an antenna 12 for the mobile phone (hereinafter called as "a first antenna") and an antenna feeding point 13 constituting a circuit dedicated to the mobile phone (the mobile phone portion) which is mounted on a not-shown board and coupled to the first antenna 12 and further includes a battery chamber 10A for housing a battery unit (hereinafter called as "a battery pack") 3 therein and a battery lid 10B which closes the battery chamber 10A, etc.

Figure 4:
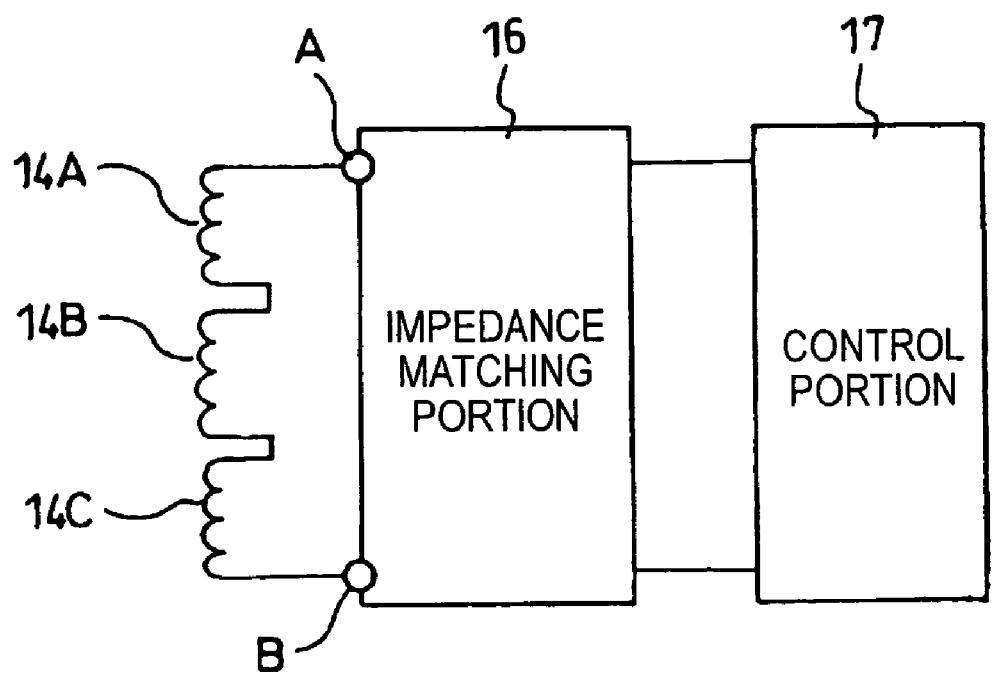
[FIG. 4] A block diagram showing the electrical configuration of a proximity contactless communication portion according to the first embodiment of the invention.
Figure 6:
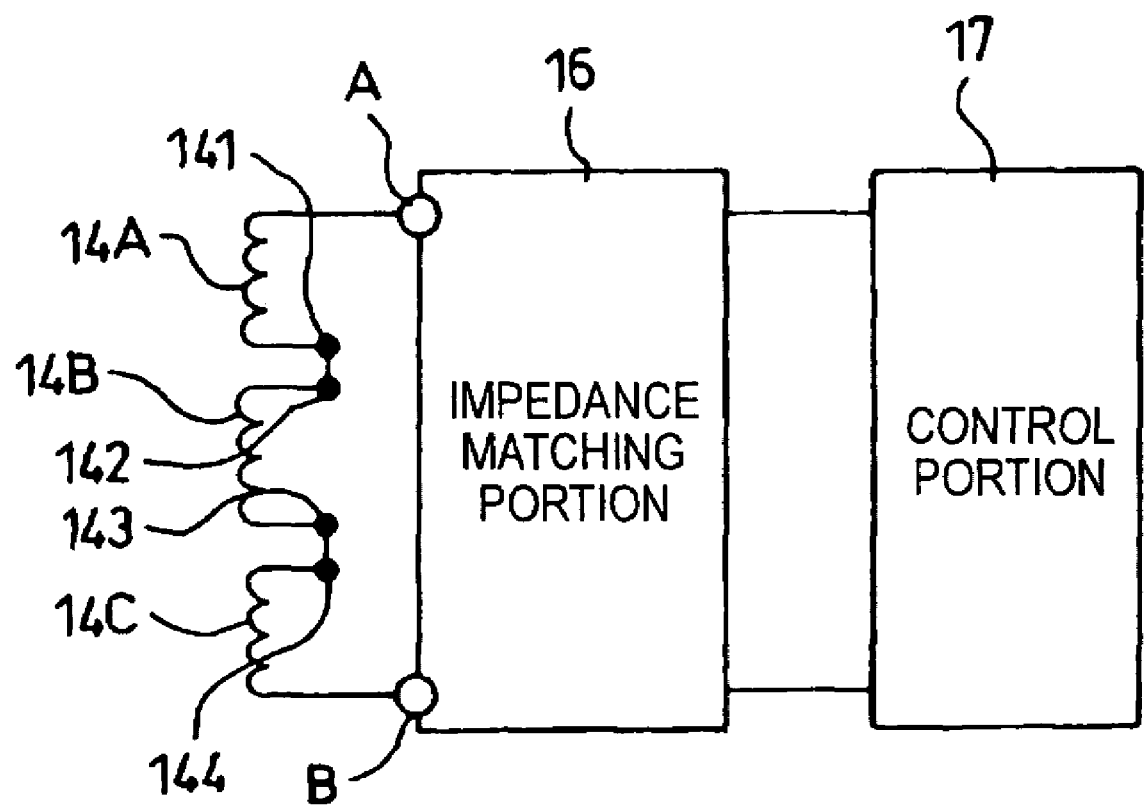
[FIG. 6] A block diagram showing the electrical configuration of the proximity contactless communication portion in the case of using another pattern of the antennas for the proximity contactless communication according to the first embodiment of the invention.

Further, the casing 10 mounts therein antennas 14A to 14C for the proximity contactless communication (hereinafter called as "second antennas"), an IC chip for the proximity contactless communication having a contactless IC card function and peripheral parts, that is, an impedance matching portion 16 and a control portion 17, etc. as shown in FIGS. 4 and 6.

Although the second antennas are configured by three antennas, the present invention is not limited thereto and the number of antennas constituting the second antennas may be two or more.

On the other hand, the external proximity contactless communication device 2 is disposed at the wicket of a station or a tollgate of a toll road, etc., for example (of course, not limited thereto), and performs the proximity contactless communication with the device having the proximity contactless communication function. To this end, within the external proximity contactless communication device 2, there is disposed an antenna 21 for the proximity contactless communication at a position closer to a surface (a portion corresponding to the lower surface in FIG. 1, which is hereinafter called as "a communication surface") opposing to the mobile communication device 1.

The "proximity contactless communication" means a communication performed by using an electric field or a magnetic field as described in the "background art". As is well known, the magnetic force and the electric force are kinds of force according to the Coulomb's law and have a feature that they are reversely proportional to the square of the distance (according to the inverse square law), the force reduces rapidly in a short range. Thus, the "proximity contactless communication" in the invention represents a communication which is realized in a proximity region mainly about 10 cm or less within which the electric field or the magnetic field acts.

Next, the aforesaid two kinds of antennas will be mainly explained in detail.

The first antenna 12 is a normal antenna for a mobile phone. Communication or data communication is performed with a not-shown base station by the first antenna 12.

On the other hand, the second antennas 14A (A antenna) 14B (B antenna) and 14C (C antenna) are disposed within the casing 10 so as to be separated from the first antenna 12 by such a required distance that the entering of high-frequency radio wave (high-frequency radiation) into the antennas for proximity contactless communication from the antenna feeding point for the mobile phone can be suppressed.

Further, in the invention, the second antennas are disposed within the casing 10 so as to be closer as possible to the outer surfaces (proximity contactless communication surfaces) opposing to the external proximity contactless communication device 2 (the A antenna 14A is disposed on the upper surface, the B antenna 14B is disposed closer to the nearer surface side, and the C antenna 14C is disposed closer to the inner portion/rear surface side in FIG. 1) so that the proximity contactless communication can be performed surely between the antenna 21 for the proximity contactless communication of the external proximity contactless communication device 2 and the second antennas via the proximity contactless communication surface.

Figure 2:
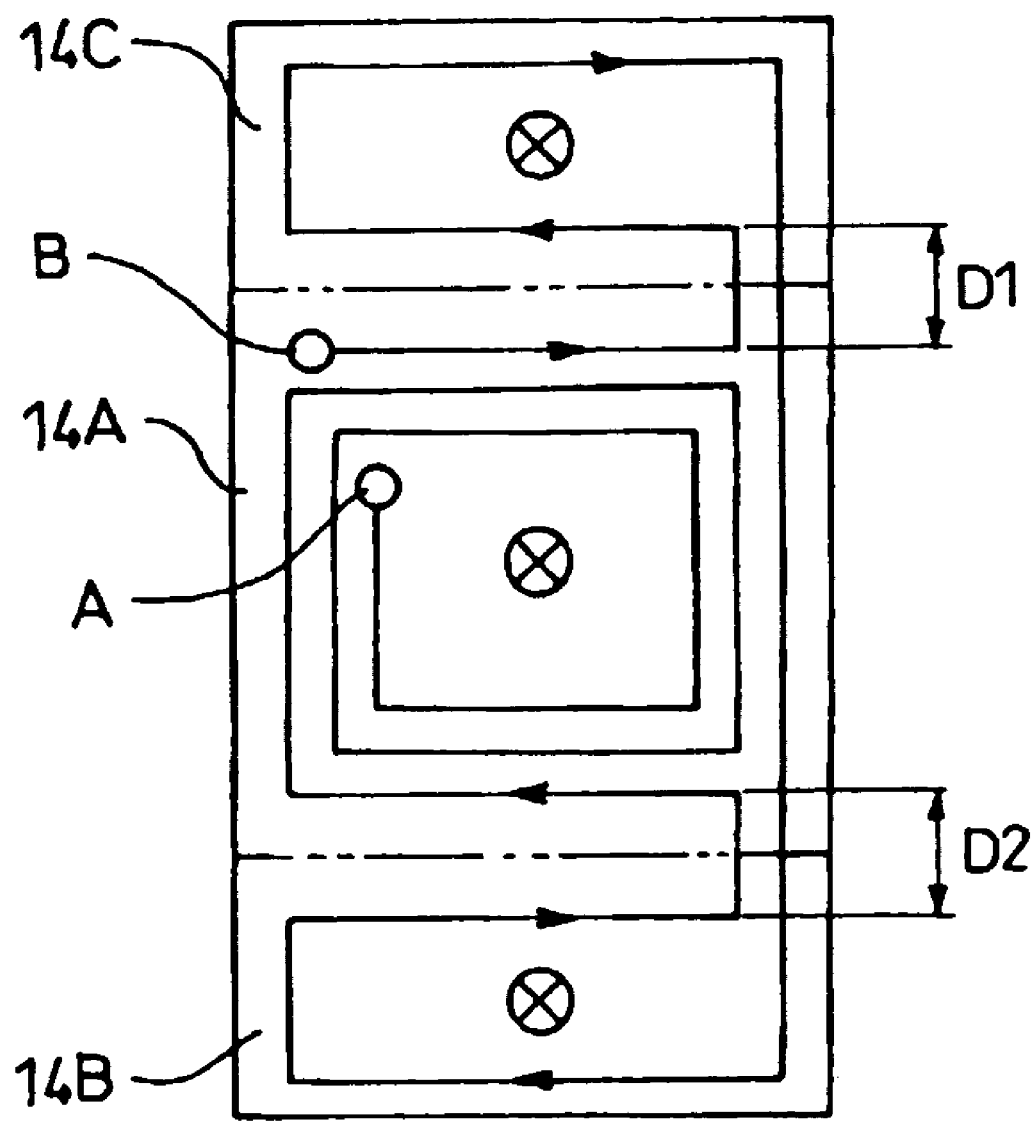
[FIG. 2] A development showing the pattern of the antennas for the proximity contactless communication according to the first embodiment of the invention.
Figure 3:
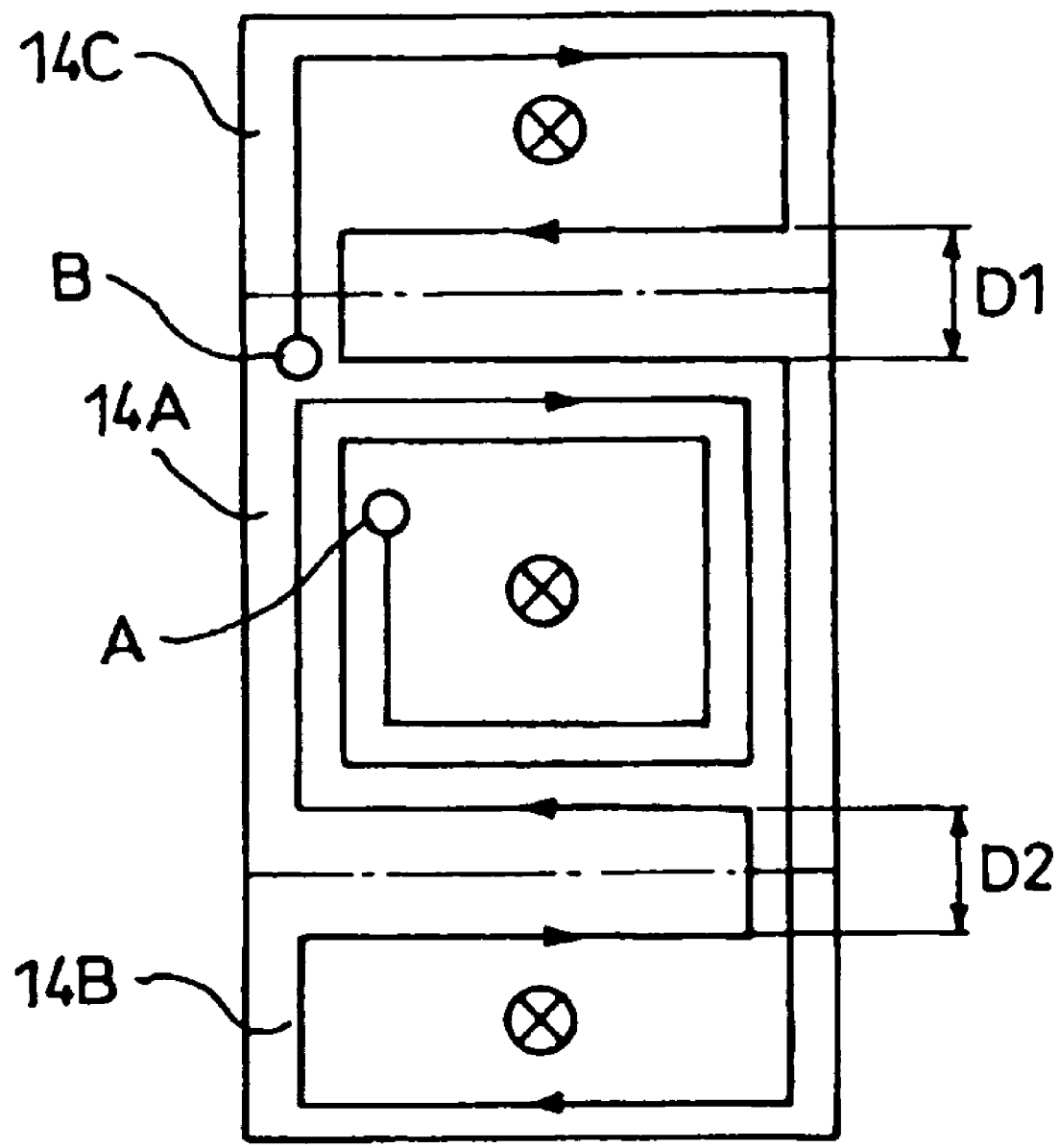
[FIG. 3] A development showing a modified example of the pattern of the antennas for the proximity contactless communication according to the first embodiment of the invention.

In particular, as shown in FIGS. 2 and 3, the A antenna 14A, the B antenna 14B and the C antenna 14C for the proximity contactless communication are configured in a manner that the plural antennas are drawn and formed in one-stroke manner on a sheet so that one or more loops are formed on each surface, then the sheet is folded along each of dotted lines so as to dispose these antennas within the casing 10 (on the inner walls of the casing), and the respective antennas are coupled in series as shown in a block diagram of FIG. 4.

Figure 5:
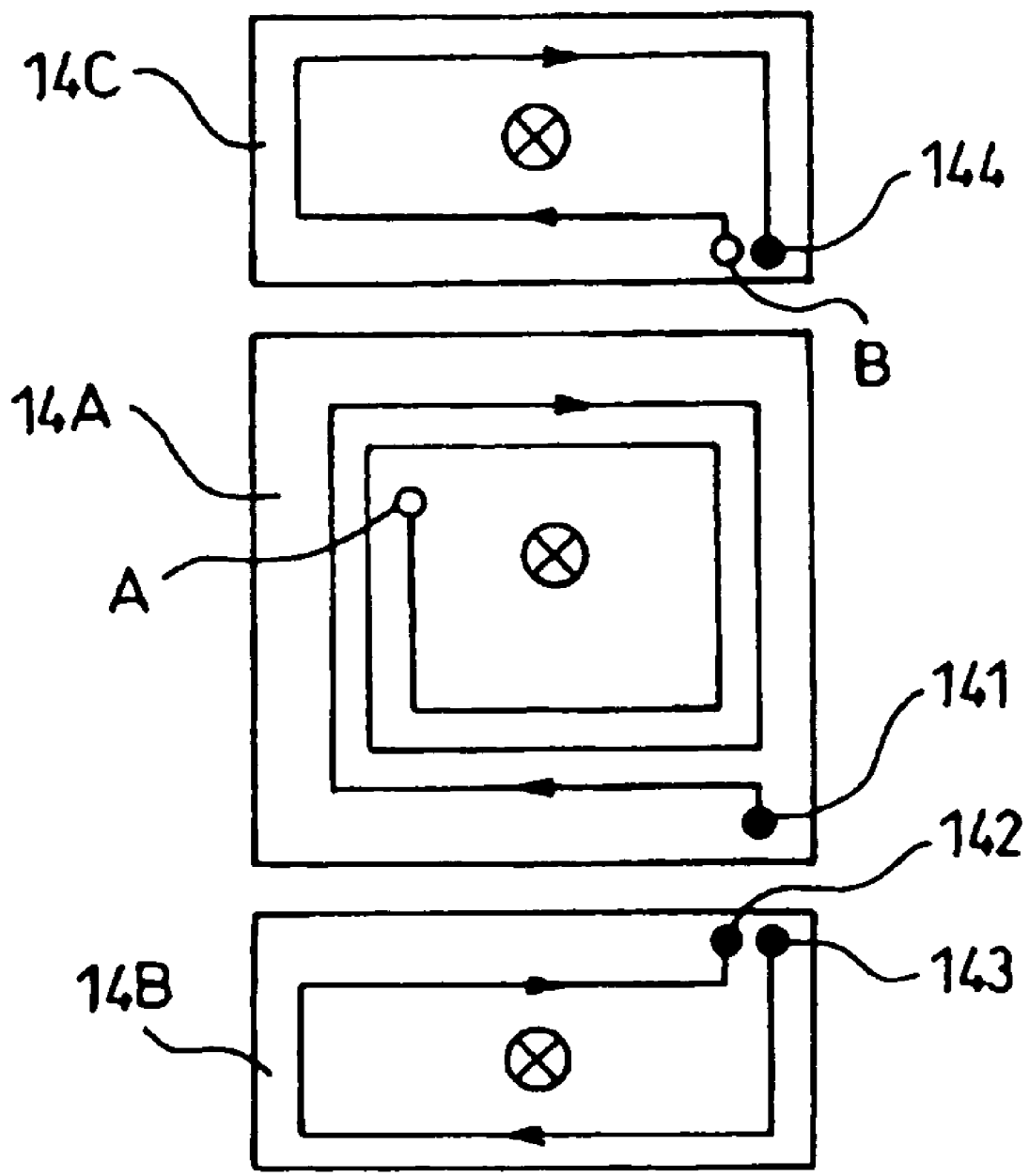
[FIG. 5] A development showing still another modified example of the pattern of the antennas for the proximity contactless communication according to the first embodiment of the invention.

Further, as shown in FIG. 5, the A antenna 14A to the C antenna 14C are respectively formed on the plural sheets so that the each antenna for the proximity contactless communication is configured by one or more loops, and the respective antennas are disposed within the casing 10. Further, as shown by a block diagram of FIG. 6, these antennas may be coupled in series. In this case, concerning the coupling state of terminals 141 to 144 on FIGS. 5 and 6, the terminal 141 is coupled to the terminal 142 and the terminal 143 is coupled to the terminal 144. So long as the A antenna 14A, the B antenna 14B and the C antenna 14C are coupled in series as shown in FIG. 6, this coupling method may be arranged in such a manner that these antennas are mounted on a not-shown board. In brief, these antennas may be coupled by any method so long as the A antenna 14A to the C antenna 14C are coupled in series.

According to the mobile communication device 1 configured in this manner, since the A antenna 14A to the C antenna 14C serving as the second antennas for the proximity contactless communication are coupled in series as shown in FIG. 4 or 6, the inductance value of the entirety of the second antennas becomes a total value of the inductance values of the respective antennas. Thus, an inductance value necessary for resonating by the entirety of the antennas for the proximity contactless communication can be obtained by a small-sized terminal such as the communication device of the embodiment.

Figure 7:
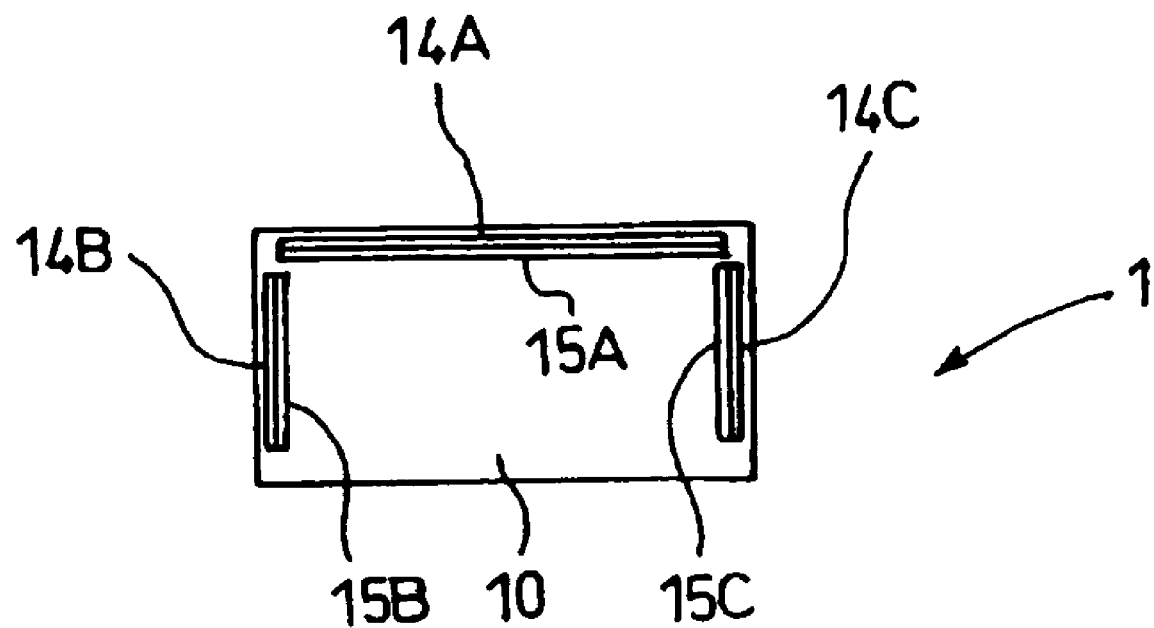
[FIG. 7] A schematic sectional diagram of a casing showing a disposing state of the antennas for the proximity contactless communication of the portable communication device according to the first embodiment of the invention.

Further, in the casing 10 of the embodiment shown in FIG. 1, as shown in FIG. 7 which is a sectional diagram of the casing 10, electromagnetic interference suppression sheets 15A, 15B, 15C are disposed near surfaces on the opposite sides of the proximity contactless communication surfaces of the A antenna 14A, the B antenna 14B and the C antenna 14C serving as the second antennas, respectively.

Figure 8:
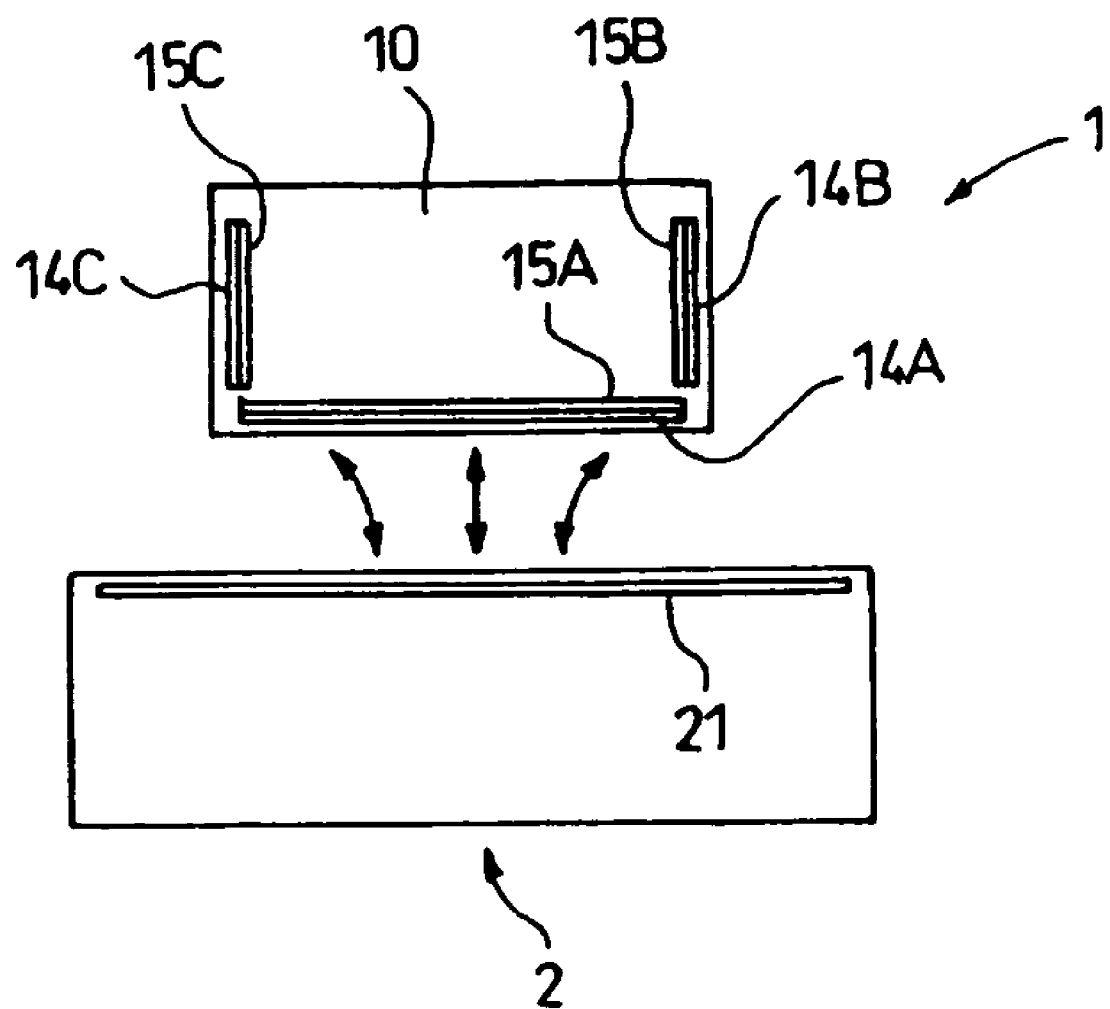
[FIG. 8] A schematic diagram showing a posture of the casing in the case of performing the proximity contactless communication between the portable communication device according to the first embodiment of the invention and the external proximity contactless communication device.
Figure 9:
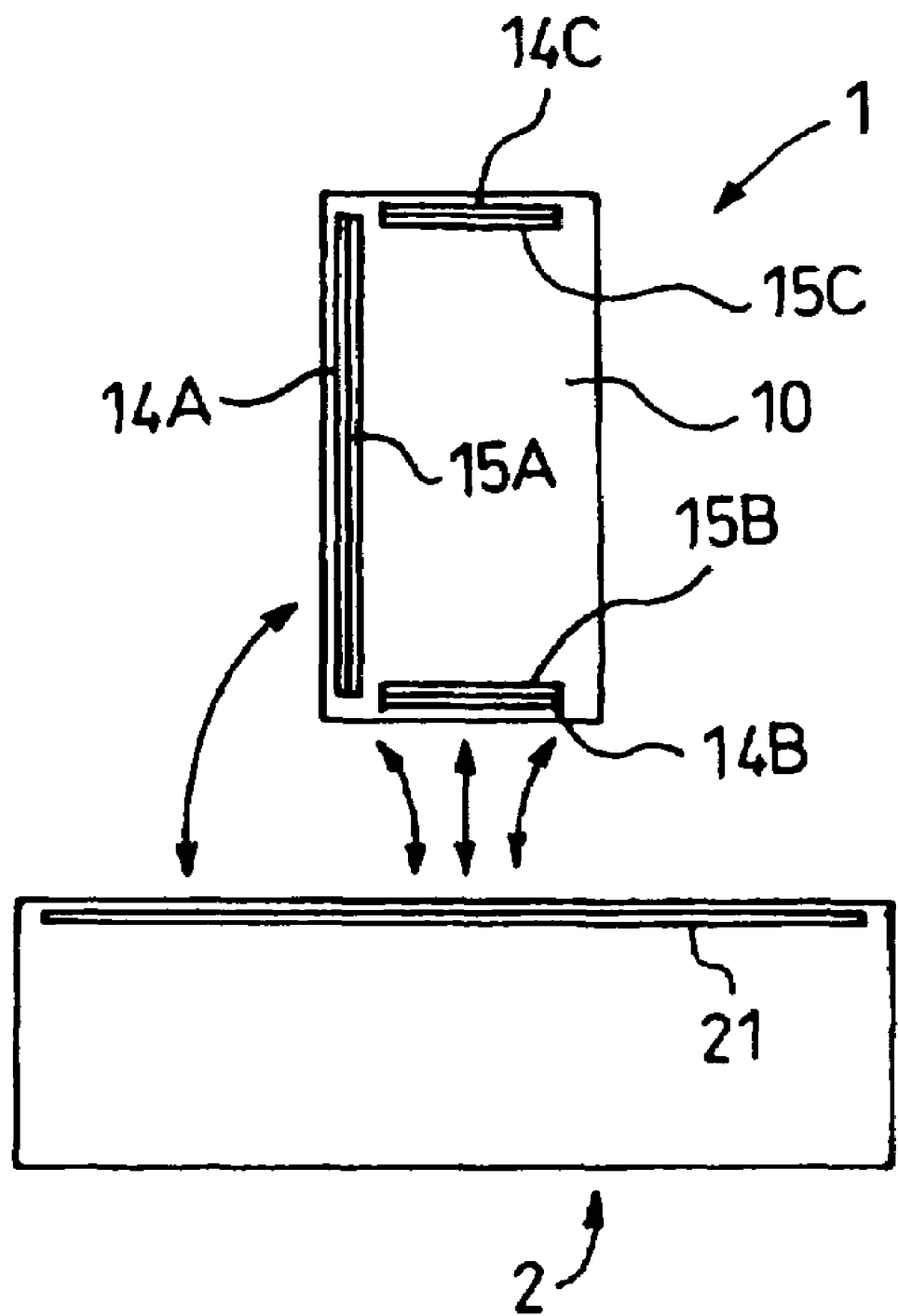
[FIG. 9] A schematic diagram showing another posture of the casing in the case of performing the proximity contactless communication between the external proximity contactless communication device and the portable communication device according to the first embodiment of the invention.
Figure 10:
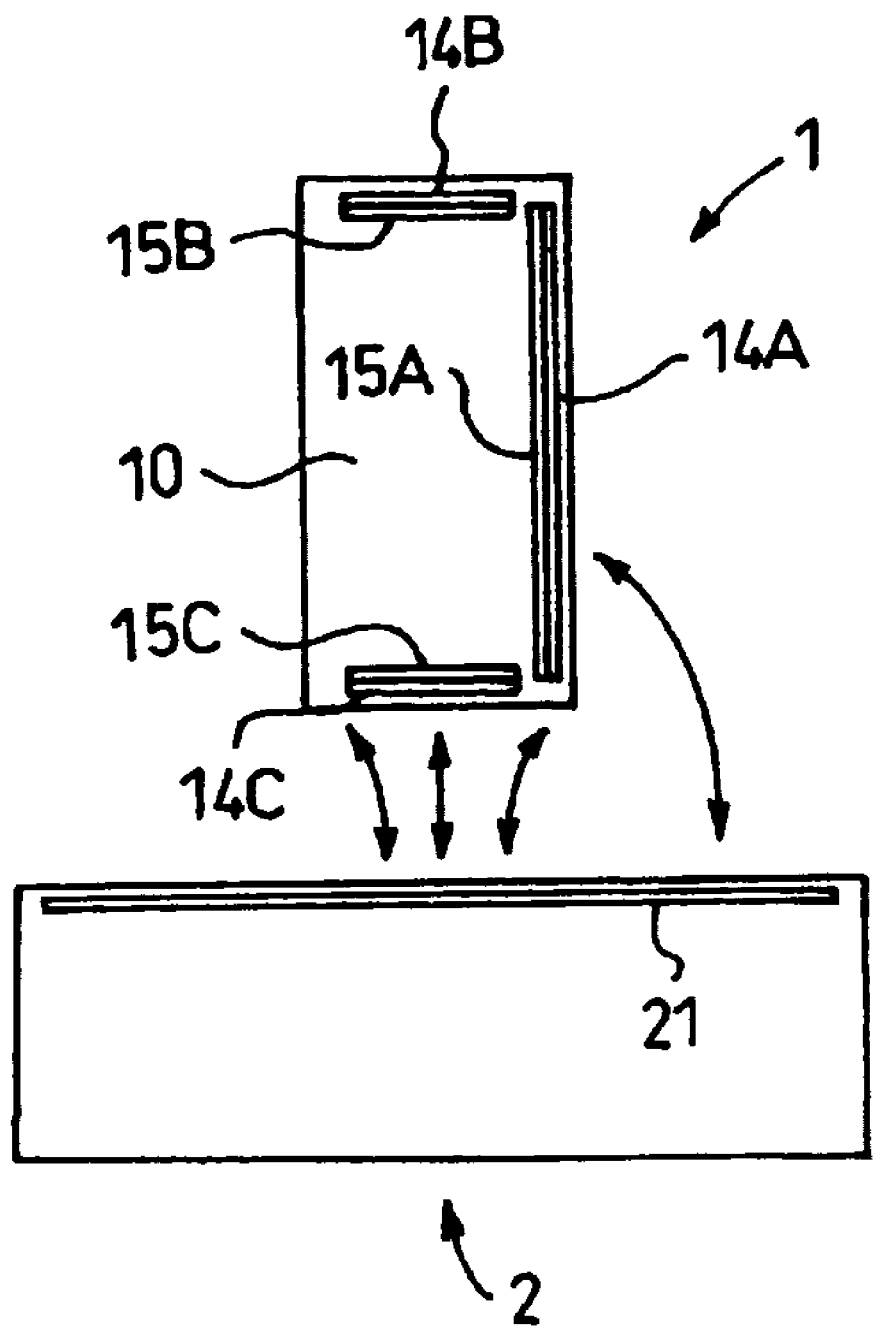
[FIG. 10] A schematic diagram showing still another posture of the casing in the case of performing the proximity contactless communication between the external proximity contactless communication device and the portable communication device according to the first embodiment of the invention.

Thus, according to the embodiment, as shown in FIGS. 8 to 10, even in a case of performing the proximity contactless communication with the external proximity contactless communication device 2 by using one of the three surfaces as the proximity communication surface, the transmission and reception of communication signals can be performed surely so long as the distance is within a required range.

Figure 11:
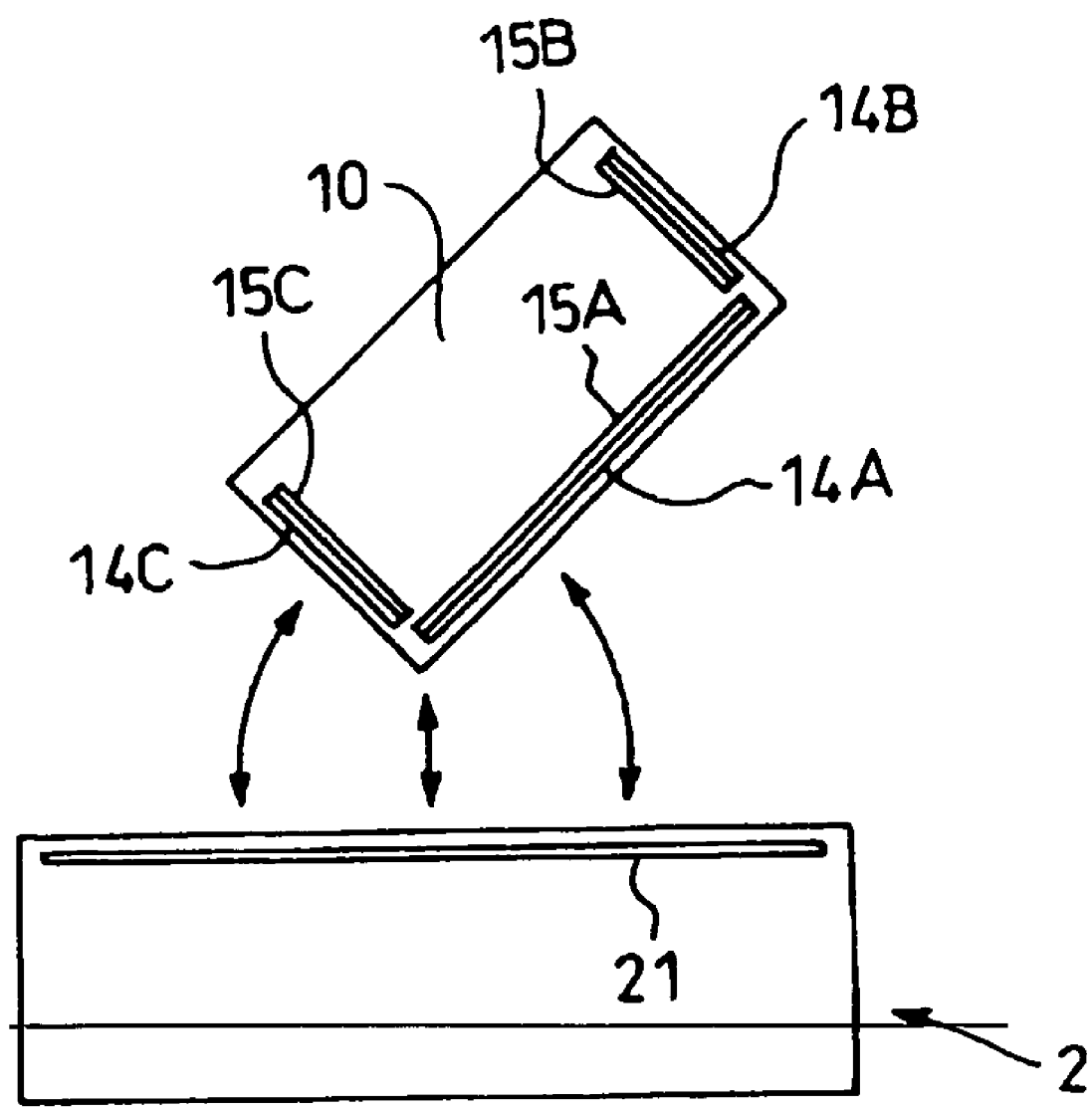
[FIG. 11] A schematic diagram showing the posture in the case of performing the proximity contactless communication by inclining the casing of the portable communication device according to the first embodiment of the invention.
Figure 12:
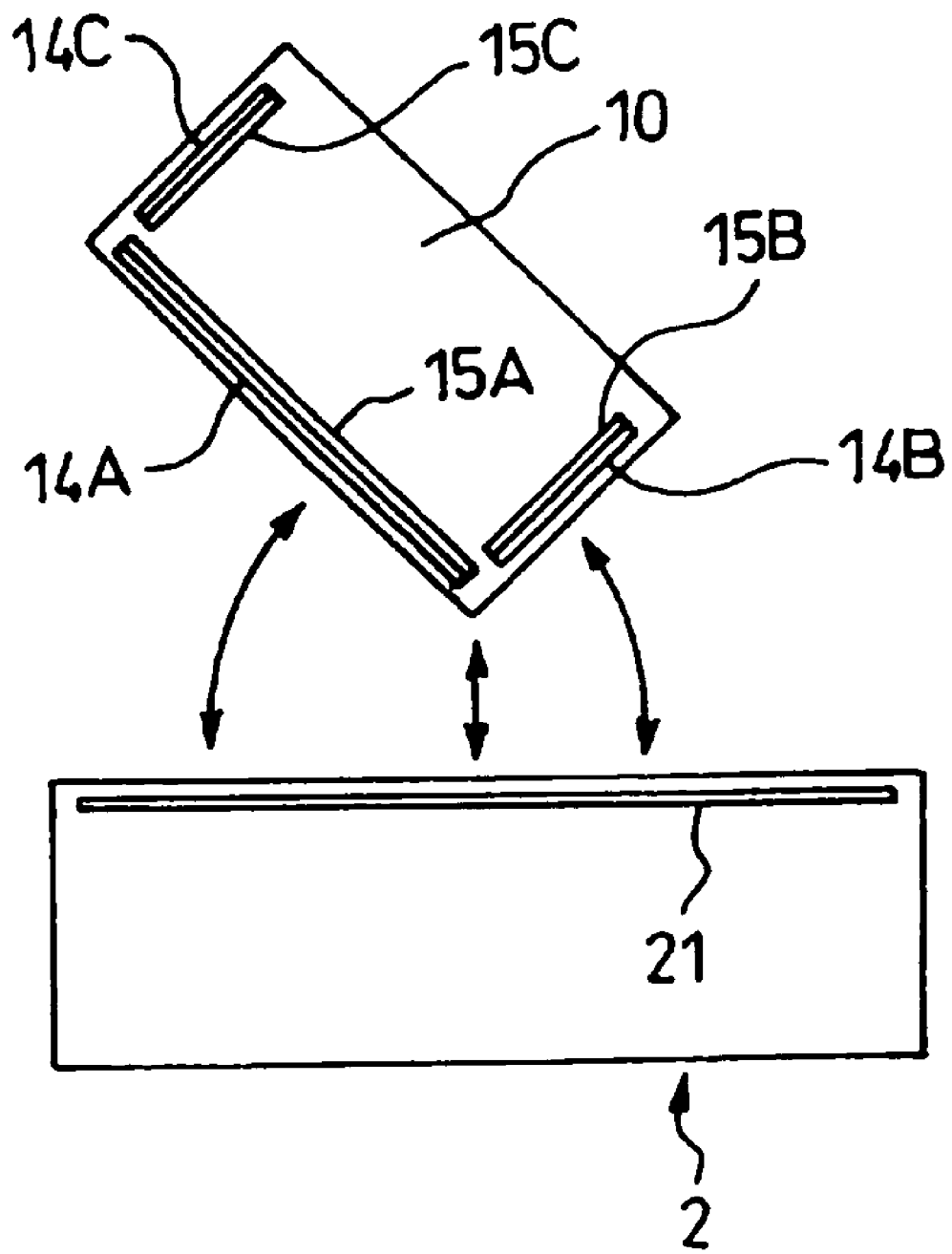
[FIG. 12] A schematic diagram showing the posture in the case of performing the proximity contactless communication by inclining, in the opposite direction, the casing of the portable communication device according to the first embodiment of the invention.

Further, even in a case of performing the proximity contactless communication with the external proximity contactless communication device 2 by placing the casing 10 of the mobile communication device 1 (a sectional diagram of the casing 10 shown in FIG. 1) in a slanted state as shown in FIGS. 11 and 12, it is sufficient to form the plural second antennas as shown in FIG. 2 or 3.

That is, supposing that distances between the adjacent antennas are D1 and D2 as shown in FIG. 2 or 3, although the distance changes depending on the pattern width or an area of an opening, when at least 1 mm or more is secured as this distance, currents flow in the same direction as for all of the second antennas when magnetic fluxes pass from the front surface side to the rear surface side of the sheet in FIG. 2 or 3. Thus, sufficient proximity contactless communication property can be obtained.

Although the second antennas are configured as shown in FIGS. 2, 3 and 5 in this embodiment, the invention is not limited thereto. That is, the second antennas may be wired in a manner that currents flow in the same direction as for all of the second antennas when the casing is postured as shown in FIGS. 11 and 12.

Therefore, in a case of performing the proximity contactless communication between the mobile communication device 1 with the proximity contactless communication function and the external proximity contactless communication device 2 as shown in FIGS. 8 to 12, the mobile communication device 1 receives magnetic fluxes radiated from the antenna 21 for the proximity contactless communication. In this case, proximity contactless signals (magnetic fluxes) are prevented from leaking into the casing 10 by the electromagnetic interference suppression sheets 15A, 15B, 15C disposed on the rear surface sides of the A antenna 14A, the B antenna 14B, the C antenna 14C serving as the second antennas, respectively.

Thus, for example, magnetic fluxes received by the A antenna 14A (second antenna) of FIG. 8 is shielded by the electromagnetic interference suppression sheet 15A, so that the magnetic fluxes passed through the A antenna 14A can be prevented from reaching the B antenna 14B and the C antenna 14C as the other second antennas.

Further, when the second antennas are wound in a manner as shown in FIG. 2, 3 or 5, sufficient proximity contactless communication property can be obtained without flowing a reverse current at the respective second antennas.

Furthermore, even if the second antennas 14A to 14C are disposed near the antenna feeding point 13 of the first antenna 12 serving as the antenna for the mobile phone as shown in FIG. 1, since the electromagnetic interference suppression sheets 15A to 15C are disposed on the rear surface sides of the second antennas 14A to 14C, respectively, as shown in FIG. 7, the high-frequency components irradiated as the mobile phone signals are prevented from entering into the second antennas 14A to 14C. Thus, the stable proximity contactless communication can be performed.

Second Embodiment

Next, the second embodiment according to the invention will be explained. In this embodiment, portions identical to those of the first embodiment are referred to by the common symbols, with explanation thereof being omitted.

Figure 13:
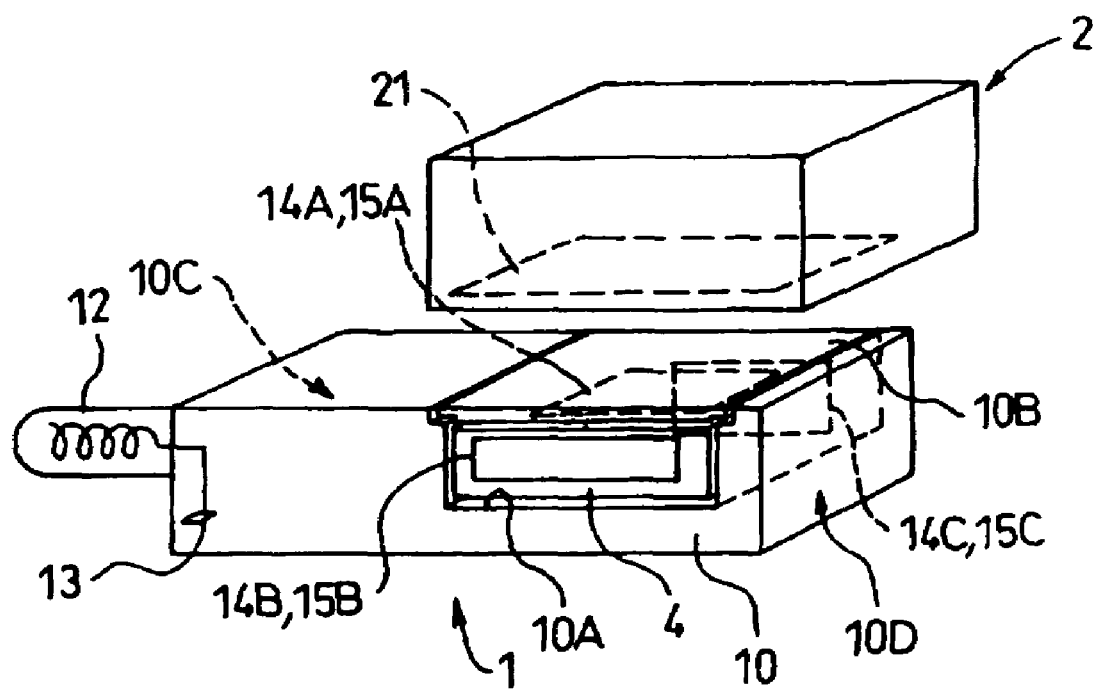
[FIG. 13] A schematic diagram showing the configurations of the portable communication device according to the second embodiment of the invention and the external proximity contactless communication device.

In this embodiment, as shown in FIG. 13, unlike the first embodiment, the second antennas 14A to 14C serving as the antennas for the proximity contactless communication and the electromagnetic interference suppression sheets 15A to 15C are disposed within the main body of the battery pack 3 for the portable communication device.

The aforesaid IC chip for the proximity contactless communication, etc. coupled to the second antennas 14A to 14C are not disposed within a battery pack 4 but within a portion of the casing 10 which is not shown. The series connection of the second antennas 14A to 14C is completed within the battery pack 4, so that the number of interfaces is generally suppressed to two although it is four depending on the function.

In this manner, since the number of the interfaces can be reduced to two from six in the related art, the reliability can be improved. Further, since only the second antennas 14A to 14C and the electromagnetic interference suppression sheets 15A to 15C are disposed within the battery pack, the thickness of the battery portion (total thickness of the battery pack 4 and the battery lid 10B) of the casing 10 can be suppressed to be larger by 1 mm or less than that of the battery portion of the portable communication device having no proximity contactless communication function.

Further, in this embodiment, since the second antennas 14A to 14C for the proximity contactless communication and the electromagnetic interference suppression sheets 15A to 15C are disposed on the three surfaces (of course, the invention is not limited thereto and they may be disposed on two surfaces or four or more surfaces), due to the presence of these electromagnetic interference suppression sheets 15A to 15C, the proximity contactless communication can be performed sufficiently by the plural surfaces without flowing the reverse currents in the respective antennas 14A to 14C. Further, the high-frequency components irradiated as the mobile phone signals can be prevented from entering into the second antennas 14A to 14C for the proximity contactless communication.

Furthermore, in this embodiment, since the battery portion (battery pack 4) for the mobile communication device is disposed at the position away from the first antenna 12 for the mobile phone and the antenna feeding point 13, they are inevitably separately to each other, so that the high-frequency components irradiated as the mobile phone signals can be prevented further surely from entering into the second antennas 14A to 14C. Thus, the further stable proximity contactless communication can be performed.

Furthermore, when the battery portion (battery pack 4) for the mobile communication device is disposed so as to have the positional relation away from the first antenna 12 for the mobile phone and the antenna feeding point 13, the battery chamber 10A housing the battery portion is disposed on anther surface of the casing different from the surface of the casing on which the first antenna 12 is disposed. Thus, the first antenna does not protrude from the surface of the casing on which the battery chamber 10A is mounted.

Accordingly, the proximity contactless communication can be performed in a state that one of the surfaces of the casing on which the second antennas 14A to 14C are disposed is brought close to the external proximity contactless communication device 2 without being interfered by a projection such as the first antenna 12. However, as shown in FIG. 14, the casing maybe placed over the external proximity contactless communication device 2 in a state that the surface 10D of the casing (the lower surface in opposite to an upper surface 10C where the first antenna 12 is disposed) which is not one of the surfaces on which the second antennas 14A to 14C are disposed is brought close to the external proximity contactless communication device 2.

Figure 14:
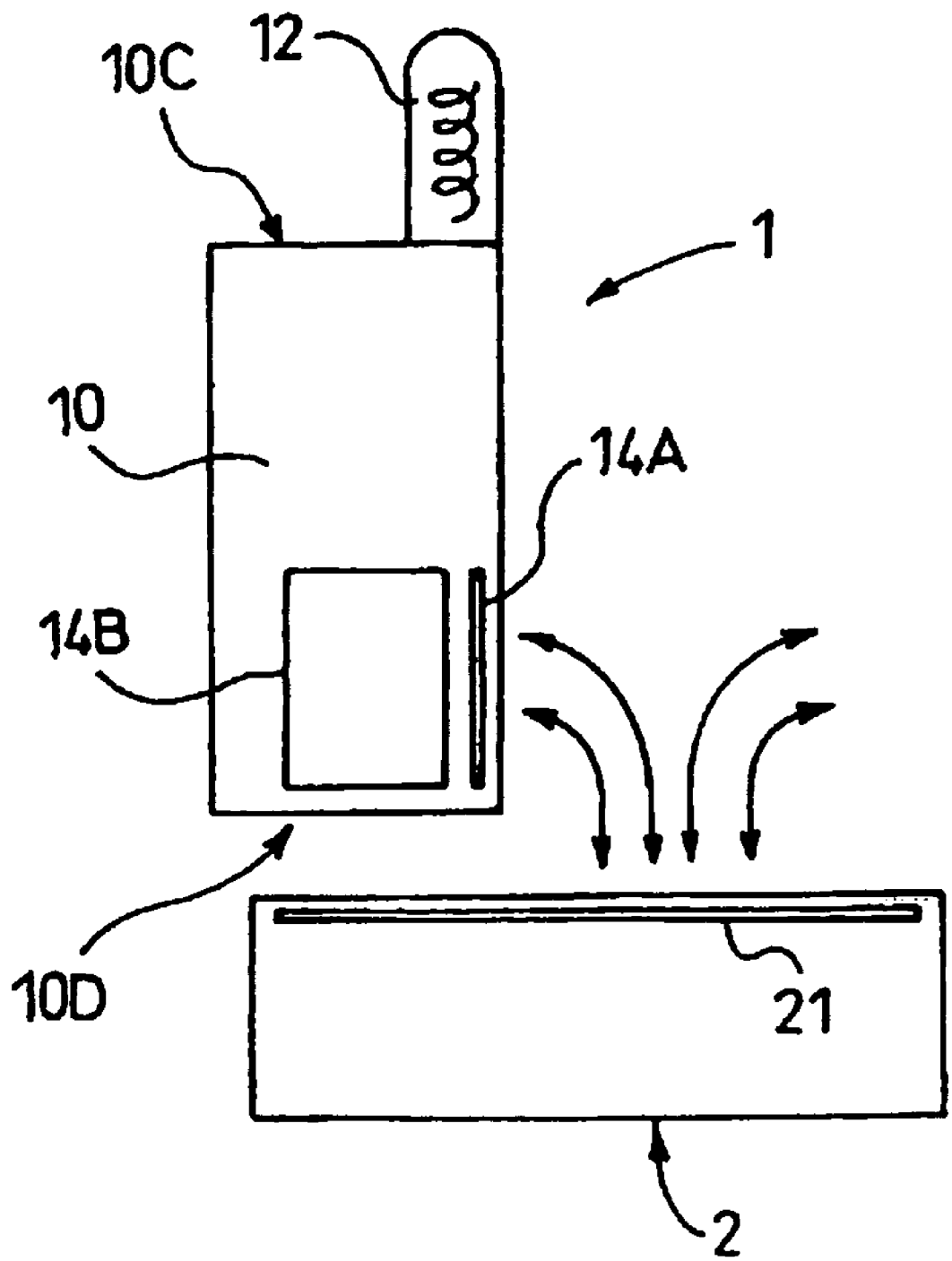
[FIG. 14] A schematic diagram showing a state in the case of performing the proximity contactless communication between the portable communication device according to the third and third embodiments of the invention and the external proximity contactless communication device.

That is, in such a state shown in FIG. 14, although the mobile communication device 1 is not placed in a positional relation in parallel to the antenna 21 for the proximity contactless communication of the external proximity contactless communication device 2, the proximity contactless communication can be performed by one of the second antennas 14A to 14C for the proximity contactless communication within the battery pack 4. In other words, even when the second antennas are disposed only on the three surfaces of the battery pack 4, the proximity contactless communication can be substantially performed by the four surfaces (also by the lower surface 10D).

Further, in this embodiment, only the second antennas 14A to 14C and the electromagnetic interference suppression sheets 15A to 15C are disposed within the battery pack 4, and the IC chip for the proximity contactless communication coupled to the second antennas 14A to 14C are disposed within the portion of the casing 10 which is not shown, as described above. Thus, even if the battery pack 4 is lost and picked up by a third party, the battery pack 4 can not be abused by the third party. That is, the safety can be secured sufficiently with respect to the security without taking complicated measures of software. Further, the proximity contactless communication function can be restored again by using the battery pack 4 as a replacement.

Further, in this embodiment, the second antennas 14A to 14C for the proximity contactless communication and the electromagnetic interference suppression sheets 15A to 15C are disposed on the plural surfaces of the battery pack 4 housed in the battery chamber 10A. In contrast, in place of the battery pack 4, they may be disposed on the plural surfaces of the battery lid 10B, for example, which closes the battery chamber 10A housing the battery pack 4 therein.

Third Embodiment

Next, the third embodiment according to the invention will be explained. In this embodiment, portions identical to those of the first and second embodiments are referred to by the common symbols, with explanation thereof being omitted.

Figure 15:
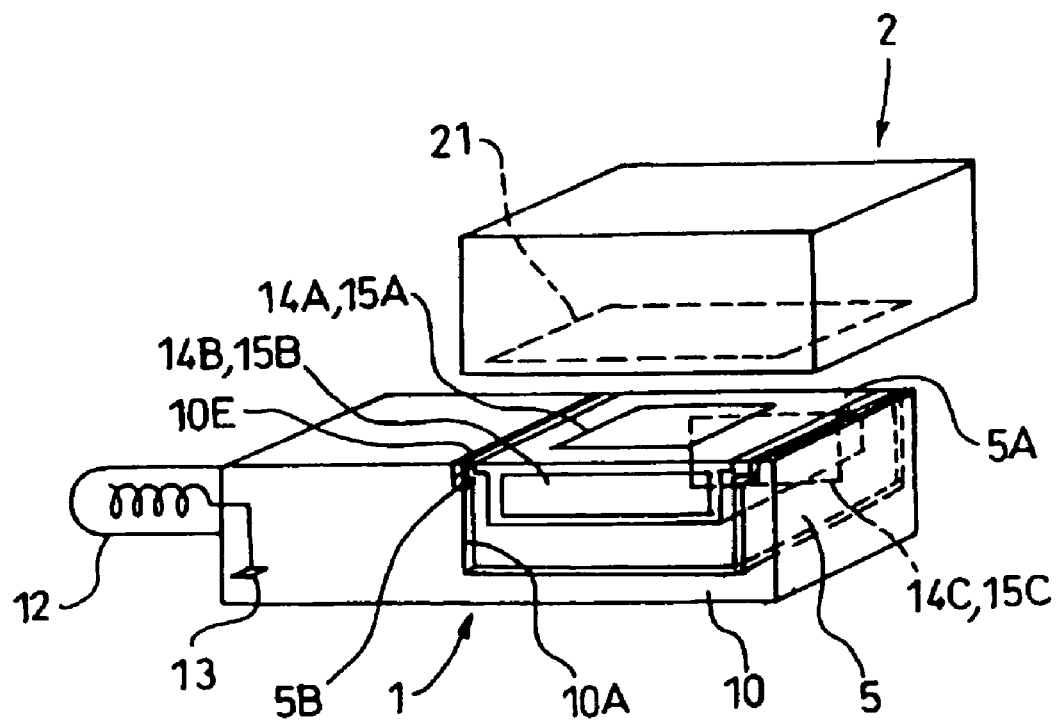
[FIG. 15] A schematic diagram showing the configurations of the portable communication device according to the second embodiment of the invention and the external proximity contactless communication device.
Figure 16:
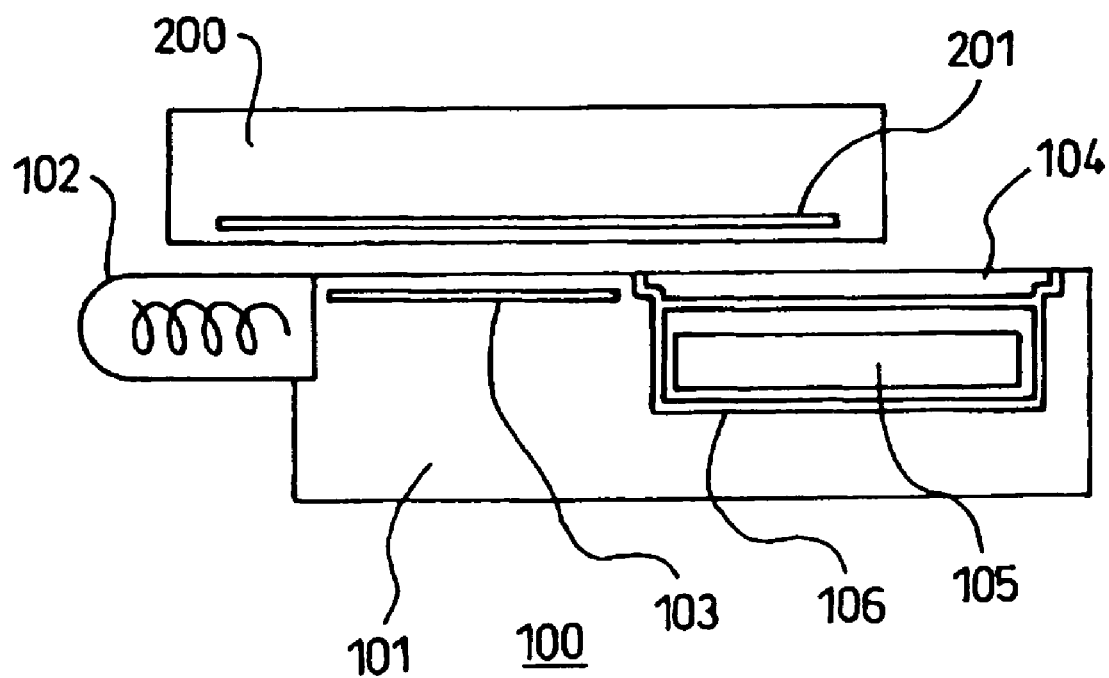
[FIG. 16] A schematic diagram showing the configurations of a portable communication device of a related art and an external proximity contactless communication device.

In this embodiment, unlike the first and second embodiments, as shown in FIG. 15, the second antennas 14A to 14C for the proximity contactless communication and the electromagnetic interference suppression sheets 15A to 15C are disposed within a battery lid (this is called as "a lid portion") 5A which is integrated with (the main body portion of) a battery pack 5 for the potable communication device.

As shown in FIG. 15, the battery pack 5 is configured in a manner that this battery pack is provided with a brim portion 5B protruding in the transverse direction at the upper surface of the main body of the battery pack 5 so that this brim portion is stopped in a state of being engaged with a step portion 10E provided along the opening portion of the battery chamber 10A.

Further, also in this embodiment, like the second embodiment, the not-shown IC chip for the proximity contactless communication coupled to the second antennas 14A to 14C within the lid portion 5A are disposed within the casing 10, whereby the number of interfaces can be suppressed to two due to the series connection of the second antennas 14A to 14C.

Thus, like the second embodiment, the reliability can be improved, and further the thickness of the battery portion (battery pack 5) can be suppressed to be larger by 1 mm or less than that of the battery portion of the portable communication device having no proximity contactless communication function.

Further, also in this embodiment, like the second embodiment, due to the presence of these electromagnetic interference suppression sheets 15A to 15C, the proximity contactless communication can be performed sufficiently by the plural surfaces without flowing the reverse currents in the respective antennas 14A to 14C. Further, the high-frequency components irradiated as the mobile phone signals can be prevented from entering into the second antennas 14A to 14C.

Further, also in this embodiment as shown in FIG. 14, like the second embodiment, even when none of the second antennas 14A to 14C of the mobile communication device 1 are placed in a positional relation in parallel to the antenna 21 for the proximity contactless communication of the external proximity contactless communication device 2, the proximity contactless communication can be performed by one of the second antennas 14A to 14C for the proximity contactless communication within the lid portion 5A of the battery pack 5. Thus, the proximity contactless communication can be performed by the four surfaces.

Furthermore, also in this embodiment, like the second embodiment, only the second antennas for the proximity contactless communication and the electromagnetic interference suppression sheets are disposed within the lid portion 5A of the battery pack 5, and the IC chip for the proximity contactless communication coupled to the second antennas 14A to 14C are disposed within the portion of the casing 10 which is not shown. Thus, the safety can be secured sufficiently with respect to the security without taking complicated measures of software.

Further, also in this embodiment, the proximity contactless communication function can be restored again by using the battery pack 5 as a replacement.

Although this embodiment is configured in a manner that the second antennas 14A to 14C for the proximity contactless communication and the electromagnetic interference suppression sheets 15A to 15C are disposed on the plural surfaces of the lid portion 5A which is integrated with (the main body portion of) the battery pack 5, they may be provided not on the lid 5A side but on (the main body portion side of) the battery pack 5.

Further, the invention is not limited to the aforesaid embodiments and can be implemented in various modes within a scope not departing from the gist thereof. For example, in each of the embodiments, although the explanation is made as an example that the communication partner of the second antennas 14A to 14C for the proximity contactless communication is the external proximity contactless communication device 2, the invention is not limited thereto. The invention maybe applied to a system which is configured to perform the proximity contactless communication with an external proximity contactless communication card.

Although the invention is explained in detail and with reference to the particular embodiments, it will be apparent for those skilled in the art that various changes and modifications can be made without departing from the spirit and scope of the invention.

The present application is based on Japanese Patent Application No. 2003-393559 filed on Nov. 25, 2003, the content of which is incorporated herein by reference.

INDUSTRIAL APPLICABILITY

The portable communication device according to the invention has the advantages that the small-sized antenna for the proximity contactless communication can be formed for the portable communication device, the proximity contactless communication can be performed by the plural surfaces and the high-frequency components irradiated as the mobile phone signals can be prevented from entering into the antennas for the proximity contactless communication. Further, the portable communication device according to the invention is useful not only for the portable communication device dedicated for the proximity contactless communication but also for various kinds of portable communication devices each having the proximity contactless communication function, for example, a mobile phone, a PHS, a PDA, etc.

The invention claimed is:

1. A portable communication device having a contactless communication function, comprising:
   a plurality of loop antennas for performing contactless communication with an external contactless communication device or an external contactless communication card, each of the loop antennas being provided on a plurality of surfaces of a casing of the portable communication device,
   wherein each of the loop antennas comprises at least one loop, and
   wherein the loop antennas are connected in series.

2. The portable communication device according to claim 1, further comprising:
   a plurality of electromagnetic interference suppression sheets,
   wherein each of the electromagnetic interference suppression sheets are placed, from each of the loop antennas, at opposite sides or near opposite sides of a communication surface facing external contactless communication device or an external contactless communication card.

3. The portable communication device according to claim 1, further comprising:
   an antenna for a mobile phone for performing mobile phone communication; and
   an antenna feeding point for the mobile phone,
   wherein the antenna for the mobile phone and the antenna feeding point are placed in separation from the loop antennas by a required distance or more.

4. A portable communication device having a contactless communication function, comprising:
   a plurality of loop antennas for performing contactless communication with an external contactless communication device or an external contactless communication card, each of the loop antennas being provided on a plurality of surfaces of a battery pack housed in a battery chamber of a casing of the portable communication device or on a plurality of surfaces of a lid portion for closing a battery chamber provided separately from the battery pack,
   wherein each of the loop antennas comprises at least one loop, and
   wherein the loop antennas are connected in series.

5. The portable communication device according to claim 4, further comprising:
   a plurality of electromagnetic interference suppression sheets,
   wherein each of the electromagnetic interference suppression sheets are placed, from each of the loop antennas, at opposite sides or near opposite sides of a communication surface facing external contactless communication device or external contactless communication card.

6. The portable communication device according to claim 4, further comprising:
   an antenna for a mobile phone for performing mobile phone communication; and
   an antenna feeding point for the mobile phone,
   wherein the antenna for the mobile phone and the antenna feeding point are placed in separation from the loop antennas for the contactless communication by a required distance or more.

7. A portable communication device having a contactless communication function, comprising:
   a plurality of loop antennas for performing contactless communication with an external contactless communication device or an external contactless communication card, each of the loop antennas being provided on a plurality of surfaces of a main body portion of a battery pack housed in a battery chamber of a casing of the portable communication device or on a plurality of surfaces of a lid portion which closes the battery chamber and is provided integrally with the battery pack,
   wherein each of the loop antennas comprises at least one loop, and
   wherein the loop antennas are connected in series.

8. The portable communication device according to claim 7, further comprising:
   a plurality of electromagnetic interference suppression sheets,
   wherein each of the electromagnetic interference suppression sheets are placed, from each of the loop antennas, at opposite sides or near opposite sides of a communication surface facing external contactless communication device or an external contactless communication card.

9. The portable communication device according to claim 7, further comprising:
   an antenna for a mobile phone for performing mobile phone communication; and
   an antenna feeding point for the mobile phone,
   wherein the antenna for the mobile phone and the antenna feeding point are placed in separation from the loop antennas by a required distance or more.

* * * * *